March 11, 1930.  A. H. VALENTINE ET AL  1,750,290
SIZING DIE FOR FLANGE BEARINGS
Filed Jan. 6, 1928  3 Sheets-Sheet 1

Inventors
Albert H. Valentine
John C. Lemming
By Spencer Hardman
and Fehr
Their Attorneys March 11, 1930. A. H. VALENTINE ET AL 1,750,290

SIZING DIE FOR FLANGE BEARINGS

Filed Jan. 6, 1928  3 Sheets-Sheet 3

Inventors
Albert H. Valentine
John C. Lemming
By Spencer Hardman
and Fehr
Their Attorney Patented Mar. 11, 1930

1,750,290

UNITED STATES PATENT OFFICE

ALBERT H. VALENTINE AND JOHN C. LEMMING, OF DAYTON, OHIO, ASSIGNORS TO THE MORAINE PRODUCTS COMPANY, OF DAYTON, OHIO, A CORPORATION OF OHIO

SIZING DIE FOR FLANGE BEARINGS

Application filed January 6, 1928. Serial No. 244,997.

This invention relates to a method of surfacing and sizing bushings, more particularly flanged bushings, to a desired predetermined size, and to a suitable apparatus for carrying out this method.

The principal object of this invention is to devise a simple, economical and very effective method of sizing bushings to any predetermined size desired and of giving these bushings a smooth surface.

It is a further object of the invention to provide a simple and efficient apparatus for carrying out the above method.

This invention is intended primarily for use with bearing or guide bushings formed by mixing finely divided metal particles and other materials such as graphite and a volatile void forming substance such as salicylic acid compressing a quantity of this mixture to form a bushing of the desired shape and heating the bushing so formed in a non-oxidizing environment at a temperature and for a time sufficient to cause alloyage of the metals, and to volatilize the void forming substance so as to form within the bushing a large number of intercommunicating, minute voids in which lubricant may be absorbed.

In carrying out the above described heating operation it has been found that the bushings distort or change their dimensions slightly and hence it becomes important that the bushings be sized to the exact required dimensions after the heat treatment.

When bushings of the character described, which are porous and impregnated with oil, are used, it is desirable that the interior surface, which contacts with the relatively moving part, be smooth and it is equally important that this surface is not burnished, because burnishing of the surface would prevent flow of lubricant from the body of the bushing to the bearing surface thereof. It is equally desirable that the outer surface of the bushing be smooth but unburnished to facilitate accurate fitting of the bushing within the recess or seat in which it is received, and to permit the bushing to be employed in association with some form of lubricant reservoir which supplies lubricant for absorption through the outer surface of the bushing. If the outer surface was burnished the lubricant in the reservoir would not be absorbed through such surface. It is therefore a further object of the invention to devise a method of sizing bushings to the exact size desired and smoothing the surface thereof without burnishing said surface; and to provide a suitable apparatus for carrying out such method.

Briefly, these objects are accomplished according to the present invention by positioning the bushing in a seat or recess formed in a die, inserting a mandrel within the bushing and operating the die to apply pressure over the entire outer surface of the bushing in a direction perpendicular to the axis of the bushing while holding the bushing on its seat in the die and simultaneously preventing any relative movement of the mandrel bushing and die in an axial direction.

Further objects and advantages of the present invention will be apparent from the following description, reference being had to the accompanying drawings wherein a preferred embodiment of one form of the present invention is clearly shown.

Figure 1:
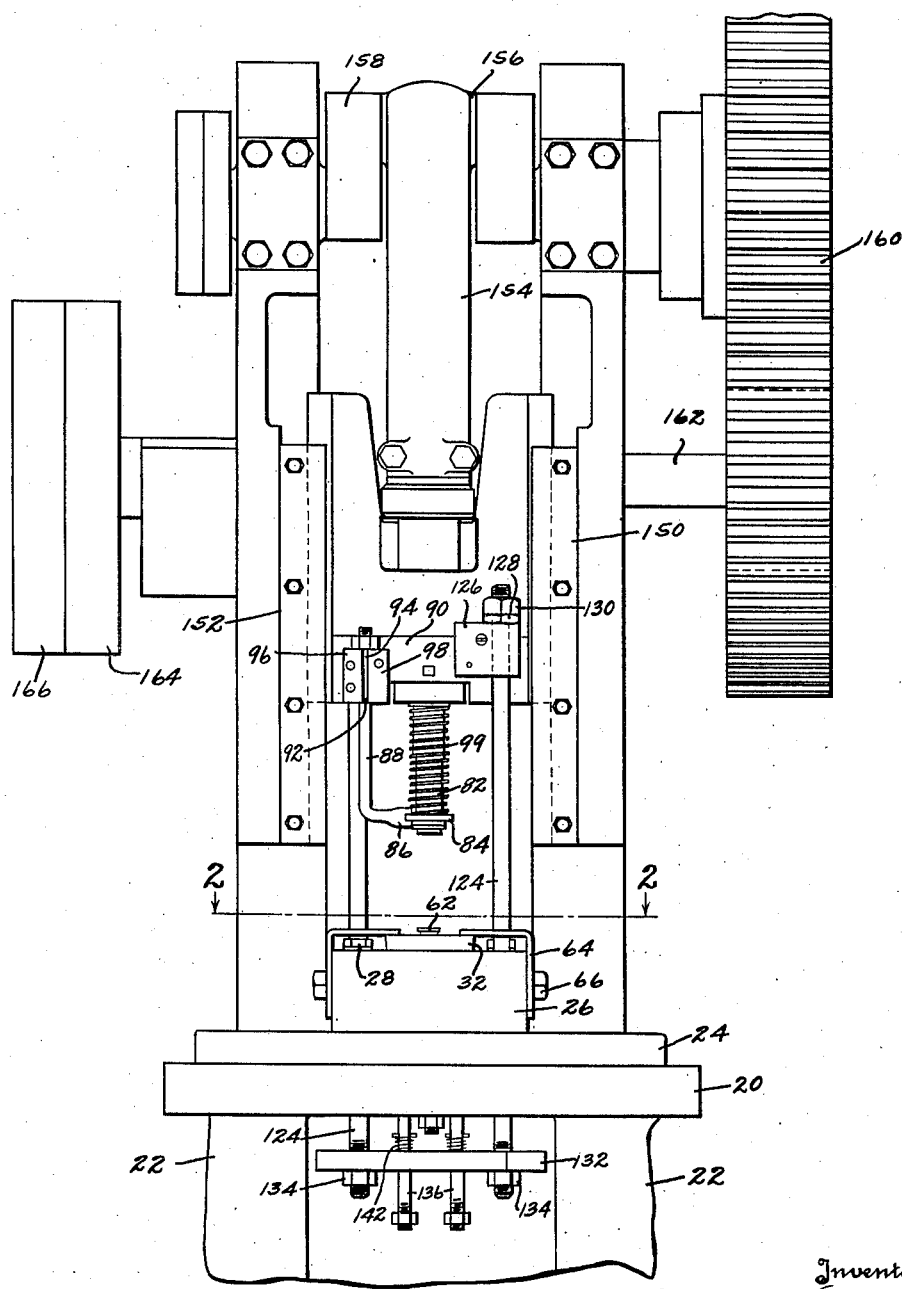
Fig. 1 is a front elevation of a suitable machine for carrying out the method of sizing according to the present invention.
Figure 2:
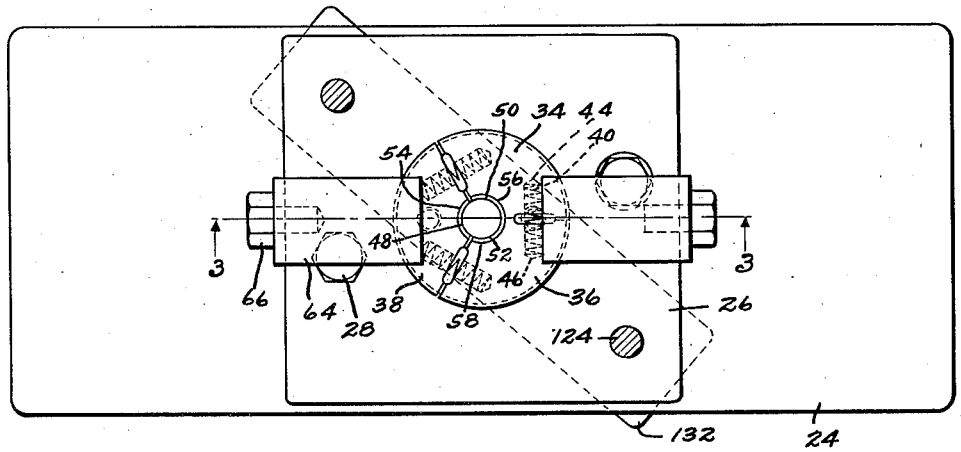
Fig. 2 is a fragmentary section on the line 2—2 of Fig. 1.
Figure 3:
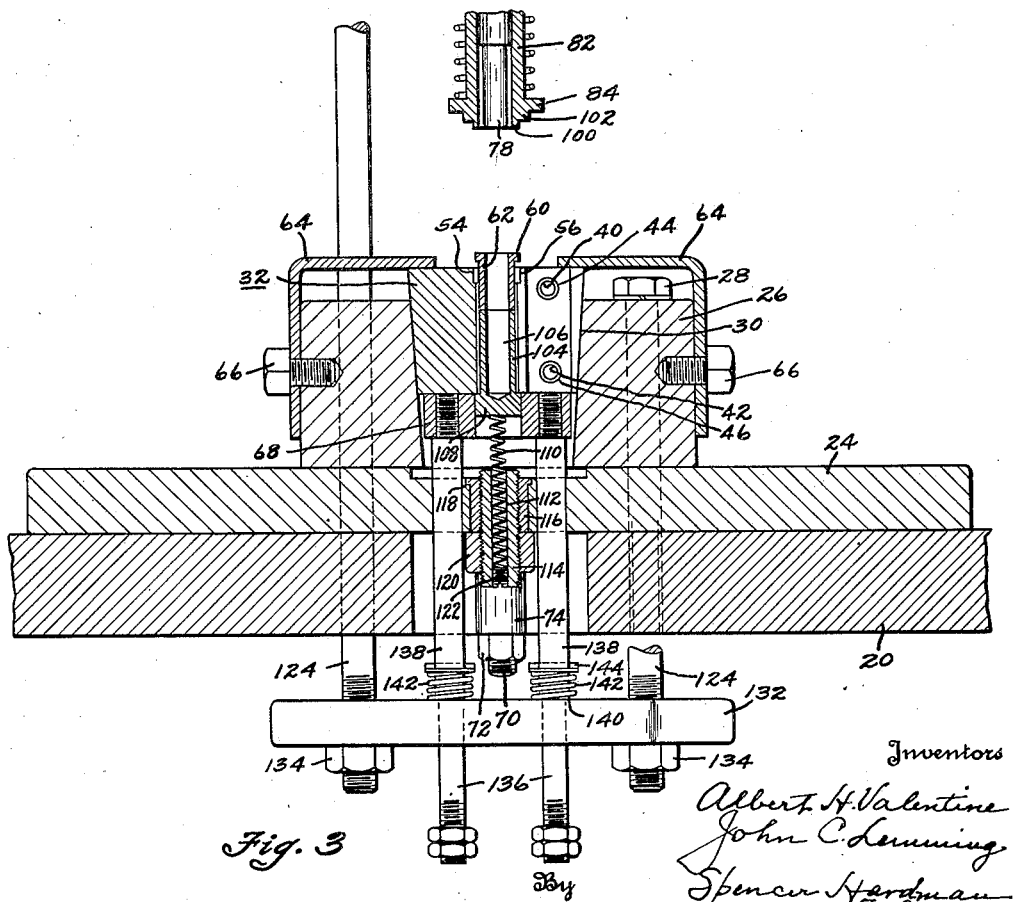
Fig. 3 is a fragmentary vertical section showing the die in raised position.
Figure 4:
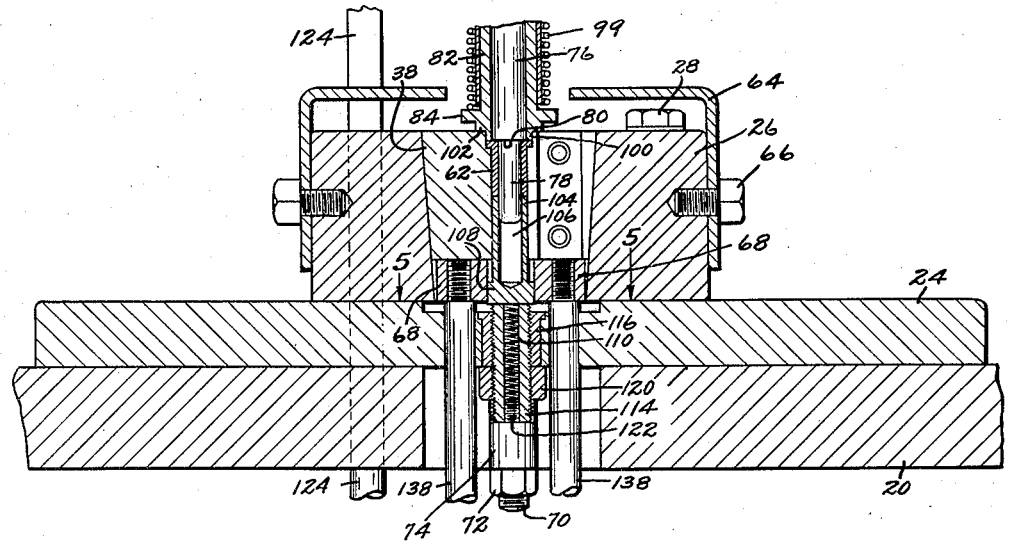
Fig. 4 is a similar section showing the die in lowered position.
Figure 5:
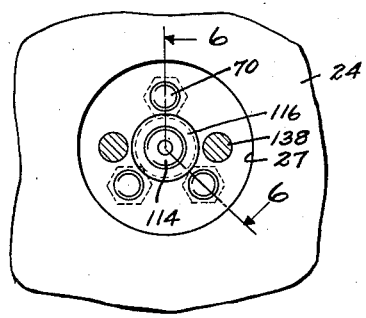
Fig. 5 is a detail horizontal section on the line 5—5 of Fig. 4.
Figure 6:
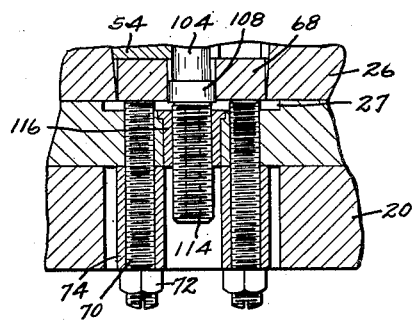
Fig. 6 is a detail vertical section on the line 6—6 of Fig. 5.

Referring to Fig. 1 of the drawings, the reference number 20 indicates a plate or table supported by standards 22 extending upwardly from a suitable base (not shown). A second plate or table 24 is secured in any desirable way to the table 20, and provided with a recess 27 at the center of its upper surface, for a purpose later set forth. Resting on the plate 24 is a block 26 secured thereto by bolts 28. The block 26 provides a tapered seat 30 for a die 32, of suitably hardened steel constructed in a manner more fully described hereinafter and adapted to reciprocate in a vertical direction within the seat 30 for a purpose later set forth. The die is formed of three separate segmental blocks 34, 36 and 38 clearly shown in Fig. 2 and having a central opening within and tapered outer walls parallel to the tapered seat 30. When the die is in its raised position as shown in Fig. 3, the segmental blocks are spread slightly apart by upper and lower springs 40 and 42, there being three springs 40 and three springs 42 provided. Each spring 40 and 42 is received in recesses 44 and 46 disposed opposite to each other in the adjacent vertical walls of an adjoining pair of the segmental blocks above referred to. All of said recesses in the segmental blocks are identical. The inner vertical walls 48, 50 and 52 of the segmental blocks are formed as parts of a cylinder so that when the die is in its lowered position, as shown in Fig. 4, with the segmental blocks contacting each other, a complete cylinder is formed within the die. The walls 48, 50 and 52 have shoulders 54, 56 and 58 respectively at the top thereof, which, when the die is in lowered position, form an enlarged cylindrical recess constituting a seat for the flange 60 of a bushing 62.

The upward movement of the die is limited by angular brackets 64, secured by bolts 66 to the block 26 and projecting above the die as shown in Figs. 3 and 4.

An annular member 68 is received within the seat or recess 30 between the die and the bottom of recess 31, and operates to limit the downward movement of the die. This annular member is adapted to be lifted by means hereinafter described, to lift the die to the position shown in Fig. 3 after a sizing operation, and moves downwardly with the die until its lower face engages three adjustable stop pins 70 screwed into the plate 24 and held in position by lock nuts 72 screwed on the pins and engaging sleeves 74 loosely mounted on said pins between nuts 72 and the plate 24. Obviously by loosening the nuts 72 and changing the position of the pins 70, the lowermost position of the member 68 and the die which is controlled thereby may be adjusted as desired. By changing the position of the pins 70 with consequent alteration of the downward movement of the die, the machine may be adjusted to size bearings of different thickness, as will be described more fully when the operation of the machine is discussed. The pins 70 may be adjusted to permit the member 68 to move downwardly below the bottom of the block 26 into the recess 27 in order to permit the die to move below the normal lowermost position of said die to compensate for wear on the outer surface of the die or seat 30.

The die is lowered during the sizing operation by means of a mandrel 76 which is reciprocated vertically by means later described. The mandrel is provided with a reduced lower end 78 forming a shoulder 80 where it joins the larger portion 76. Slidably mounted on the larger part of the mandrel 76 is a sleeve 82, provided with a flange 84 engaging the notched end 86 of a bent rod 88 vertically slidable in the cross head 90 which supports the mandrel, and provided with a pin 92 engaging in a slot 94 formed between two plates 96 and 98 secured to the cross head to prevent rotation of the rod 88. The sleeve is normally held in position on the lower end of the mandrel by a compression spring 99 received between the cross head and flange 102 and is provided with a reduced lower end 100 adapted to strike the bushing as the mandrel is lowered, and a shoulder 102 which engages the top of the die, the reduced portion 100 being of the proper length to hold the flange 60 of bushing 62 against the shoulders 54, 56 and 58 previously described.

Received within the central orifice formed in the die immediately below the bushing is an ejector member which is adapted to eject the sized bushing from the die when the die is lifted after a sizing operation. This ejector has a central recess 106 formed in the upper portion thereof to receive the lower end 78 of the mandrel when the latter is moved downwardly and an enlarged solid head at its lower end which strikes against the bottom of the die to limit the upward movement of the ejector.

The ejector is moved upwardly by a spring 110 which engages the head 108 and is received in a recess 112 formed in a nipple 114 screwed into a flanged plug 116 received in a shouldered recess 118 in the plate 24. The plug 116 is held fixed in the recess 118 by a nut 120 screwed on the lower end of the nipple and the lower end of the spring engages a solid plug 122 screwed into said nipple 114 so as to exert at all times an upward pressure against the ejector. The tension of the spring 110 may be adjusted by loosening the nut 120 and raising or lowering the nipple 114 relative to plug 116 and again tightening the nut or by adjusting the threaded plug 122.

The die is lifted after a sizing operation by means of two rods 124 loosely slidable at their upper ends in guide plates 126 secured to opposite sides of the cross head as indicated in Fig. 1. Each rod has screwed on its upper end a nut 128 adapted to be engaged by a guide plate 126 during upward movement of the cross head to lift the rod, and a lock nut 130 is provided to hold each nut 128 in its adjusted position. Rods 124 at their lower ends are screwed into holes formed in a plate 132 which is positioned at an angle to the plate 20 as indicated in Fig. 2. Nuts 134 are provided on the ends of rods 124 and engage the plate 132 to lock said plate in position on rods 124. The cross head 90 moves through a considerably greater distance than the die 32 or plate 132, and to permit such movement the rods 124 are loosely received in guides 126, providing a lost motion connection.

Also projecting through the plate 132 are the reduced lower ends 136 of rods 138, the upper ends of which are screwed into the annular member 68. Shoulders 140 are formed where the reduced portions 136 of the rods 138 join the larger parts of said rods, and these shoulders are engaged by the plate 132 when said plate is lifted on upward movement of rods 124. Surrounding the rods 138 are coiled springs 142 which are received between the upper surface of plate 132 and pins 144 fixed in rods 138 a short distance above the shoulders 140.

The springs 142 are provided to insure the lifting of the member 68 and die 32 to the upward limit of their movement on every upward movement of the cross head 90, and to obviate the necessity of absolutely accurate adjustment of the plate 132. For instance if the plate 132 were adjusted too low on the rods 124, or the nuts 134 became loose after a proper adjustment and the plate 132 worked down on the rods, the plate would engage shoulders 140 too late in the upward movement of the cross head to raise the member 68 and die 32 to proper position. However, such movement would compress springs 142 so that said springs would properly position said member and die.

The operation of the above described mechanism will now be set forth. We will assume that the parts are in the position shown in Figs. 1 and 3 with the cross head 90 at the upper end of its stroke, the plate 132, the die 32, the mandrel and other vertically reciprocable parts in their uppermost positions. The bushing 62 is inserted in the central opening within the blocks 34, 36, 38 forming the die, these blocks being slightly separated as indicated in Fig. 2 when the die is in raised position. The cross head 90 is then moved downwardly by means hereinafter described, lowering the mandrel 76 which carries with it the sleeve 82, the sleeve being resiliently held at the lower end of the mandrel by spring 99. The bushing, when inserted in the die as described, is held in position to project above the die by the ejector member, as shown in Fig. 3, and as the mandrel descends the bushing is first engaged by the sleeve 82, and moved downwardly until the shoulder 102 engages the top of the die as shown in Fig. 4, at which time the flange 62 of the bushing should rest on the shoulders 54, 56 and 58. On further downward movement of the cross head the reduced portion 78 of the mandrel will enter the bushing, shoulder 80 will be brought into engagement therewith and the die with the bushing seated therein will be carried down until the member 68 engages stop pins 70, the spring 99 being compressed and holding the sleeve 82 against the die during such movement. During this movement of the die, each of the segmental blocks 34, 36 and 38 which form it are moved radially and inwardly when the tapered outer surface of said blocks engages the tapered surface of the seat 30. The inward radial movement of the blocks brings them into engagement with the entire outer surface of the bearing 30, applying pressure thereto from all directions to compress the bearing on the mandrel until it is sized to the exact internal and external dimensions desired, the part 78 of the mandrel determining the exact internal size.

On upward movement of the cross head, the rods 124 are lifted, as previously described, lifting the plate 132 which moves the rods 138 upwardly through the medium of shoulders 140 and springs 142. The rods 138 raise member 68 and the die to the position shown in Fig. 3 and continued upward movement of the cross head raises the mandrel and sleeve 82 to a position above the cross head. As the sleeve 82 is moved from engagement with the bushing, the light spring 110 operates to lift the ejector 104 and force the bushing entirely out of the die, or to the position shown in Fig. 3, so that it may be removed by the operator.

Any conventional form of punch press may be employed for operating the cross head 90, the details of the press forming no part of the present invention. A conventional form of press is illustrated generally in Fig. 1. The cross head 90 is slidably received in guides 150 and 152, and is vertically reciprocated by a connecting rod 154 engaging the crank pin 156 of an operating shaft 158 driven by the large reducing gear 160 which engages a small driving gear, which is not shown, but which is positioned immediately in the rear of gear 160 and fixed on one end of the main drive shaft 162. The shaft 162 has fixed to the opposite end a driving pulley 164 and loosely mounted thereon beside the pulley 164 an idle pulley 166 to which a driving belt may be shifted when it is not desired to operate the machine.

During the compressing operation, the walls of the bushing are compressed beyond the elastic limit of the material forming the bushing. Hence when the bushing is removed from the die and the compressing pressure removed it will expand only a very slight amount. Thus the internal diameter of the die when in lowered position and the portion 76 of the mandrel determine the dimensions of the finished bushing. The degree of compression of the walls of the bushing is determined by the dimensions thereof before resizing, and the thickness of the bushing walls may be varied to vary the degree of compression to which the material in the bushing is subjected, if desired.

The high pressure exerted on the bushing walls gives a very smooth surface which is most desirable when the bushing is to be used as a bearing. Moreover it will be noted particularly that there is no relative sliding movement between the bushing and either mandrel or die during the sizing operation so that there will be no burnishing of either internal or external surfaces of the bushing. Thus there is no decrease in the porosity of the inner surface to prevent flow of lubricant from the bushing to the surface contacting therewith, and no reduction of porosity of the outer surface to prevent absorption of lubricant by the bushing from a supply reservoir, in case it be desired to employ such a reservoir in connection with the bushing.

While the form of embodiment of the present invention as herein described, constitutes a preferred form, it is to be understood that other forms might be adopted, all coming within the scope of the claims which follow.

What is claimed is as follows:

1. The method of forming a compressible bushing to a desired predetermined size which consists in placing the bushing within a die, inserting a mandrel within the bushing and applying pressure to the outer surface of the bushing in a direction normal to the axis thereof while it is within the die.

2. The method of forming a compressible bushing to a desired predetermined size which consists in placing the bushing within a die, inserting a mandrel within the bushing, applying pressure to the outer surface of the bushing while it is within the die and preventing relative axial movement between the mandrel, die and bushing during the pressing operation.

3. The method of forming a compressible bushing to a desired predetermined size which consists in placing the bushing within a die, inserting a mandrel within the bushing and applying pressure to the entire outer surface of the bushing throughout the pressing operation.

4. The method of forming a compressible bushing to a desired predetermined size which consists in placing the bushing within a die, inserting a mandrel within the bushing, applying pressure to the outer surface of the bushing in a direction normal to the axis thereof while it is within the die, and preventing axial movement between the bushing and the die during the pressing operation.

5. The method of forming a compressible cylindrical bushing to a desired predetermined size, which consists in placing the bushing within a die, inserting a mandrel within the bushing, applying pressure to the cylindrical surfaces of the bushing while said bushing is within the die and in a direction normal to the axis thereof, and preventing relative axial movement of the mandrel, bushing and die, whereby the surfaces of the bushing are not burnished during the application of pressure thereto.

6. The method of sizing a compressible bushing to form a smooth but unburnished outer surface which consists in compressing the bushing between a die and a mandrel, and preventing any axial movement between the die and bushing during the compressing operation whereby burnishing of the outer surface of the bushing is prevented.

7. The method of sizing a compressible bushing to form smooth but unburnished inner and outer surfaces thereon which consists in compressing the bushing between a die and a mandrel and preventing any axial movement between the die, mandrel and bushing during the compressing operation whereby burnishing of both inner and outer surfaces of the bearing is prevented.

8. The method of forming a compressible bushing to a desired predetermined size and simultaneously forming smooth inner and outer surfaces thereon which consists in compressing the bushing between a die and a mandrel by applying pressure to said bearing in a direction normal to the axis thereof, and preventing axial movement between the die, the bushing and the mandrel throughout the pressing operation whereby burnishing of both outer and inner surfaces of the bushing is prevented during the pressing operation.

9. The method of forming a compressible bushing to a desired predetermined size which includes the step of compressing the bushing by applying pressure to the outer surface of the bushing and preventing any relative axial movement between said outer surface and the pressure applying tool during the pressing operation.

10. An apparatus for forming compressible bushings to a desired predetermined size having in combination an expanding die provided with a recess in which a bushing is adapted to be seated and means for closing or contracting the die while the bushing is seated therein to compress said bushing to the desired size.

11. An apparatus for forming compressible bushings to a desired predetermined size, having in combination a die comprising a plurality of movable jaws, said jaws being cut away to form a recess in which a bushing is adapted to be seated, means for moving the jaws outwardly to permit insertion of a bushing within the recess, and means for moving the jaws inwardly to apply pressure to said bushing.

12. An apparatus for forming compressible bushings to a desired predetermined size having in combination a die comprising a plurality of radially movable jaws, said jaws being cut away to form a recess in which a bushing is adapted to be seated, means for moving the jaws radially outward to permit insertion of a bushing within the recess, and means for moving the jaws radially inward to apply pressure to said bushing.

13. An apparatus for forming compressible bushings to a desired predetermined size having in combination an expanding and vertically reciprocable die provided with a recess therein, means for lifting said die, means for expanding the die when in raised position to permit insertion of the bushing in said recess, means for moving said die downwardly and means for contracting the die during its downward movement to apply pressure to said bushing.

14. An apparatus for forming compressible bushings to a desired predetermined size having in combination an expanding and vertically reciprocable die; means for lowering and contracting the die to apply pressure to the bushing, means for raising and expanding the die after a pressing operation, and means for automatically ejecting the compressed bushing when the die is expanded.

15. An apparatus for forming compressible bushings to a desired predetermined size having in combination a radially expanding and contracting die, means for raising and expanding the die to permit insertion of the bushing to be sized, means for lowering and contracting said die to apply pressure to said bushing, and means for preventing relative axial movement of the bushing and die during the pressing operation.

16. An apparatus for forming compressible bushings to a desired predetermined size having in combination a radially expanding and contracting die, means for raising and expanding the die to permit insertion of the bushing to be sized, a mandrel, means for lowering the mandrel into the bushing when said bushing is positioned in the die, simultaneously lowering and contracting said die to apply pressure to the bushing while the mandrel is inserted therein, and means for preventing any relative axial movement between the die, the bushing and the mandrel during the pressing operation.

17. An apparatus for forming compressible bushings to a desired predetermined size having in combination a die comprising a plurality of radially movable jaws, means for raising the die and simultaneously moving the jaws outwardly to permit insertion of a bushing in the die, means for lowering the die and moving the jaws inwardly to compress said bushing, and means preventing relative axial movement of the bushing and die during the pressing operation.

18. An apparatus for forming compressible bushings to a desired predetermined size having in combination a die comprising a plurality of radially movable jaws, means for raising the die and simultaneously moving the jaws outwardly to permit insertion of a bushing in the die, a mandrel, means for lowering the mandrel to insert said mandrel in the bushing positioned in the die, to lower the die and move the jaws inwardly to compress the bushing, and means to prevent relative axial movement of the mandrel, bushing and die during the pressing operation.

19. An apparatus for forming compressible bushings to a desired predetermined size having in combination a die comprising a plurality of radially movable jaws, the outer surfaces of said jaws being tapered, a seat in which said die is received having a tapered wall adjacent the tapered surface of the jaws, and means for vertically reciprocating the die within the seat to open and close said jaws.

20. An apparatus for forming flanged compressible bushings to a desired predetermined size having in combination an expanding die, a recess within the die provided with a shoulder on which the flange of said bushing is adapted to be seated, and means for closing or contracting the die while the bushing is seated in the recess to compress said bushing to the desired predetermined size.

21. An apparatus for forming flanged compressible bushings to a desired predetermined size having in combination an expanding die, a recess within the die provided with a shoulder on which the flange of said bushing is adapted to be seated, means for closing or contracting the die while the bushing is seated in the recess to apply pressure to the bushing, and other means for applying pressure to the flange of the bushing simultaneously with the closing of the die.

22. An apparatus for forming flanged compressible bushings to a desired predetermined size having in combination an expanding die, a recess within the die provided with a shoulder on which the flange of said bushing is adapted to be seated, means for closing or contracting the die while the bushing is seated in the recess to apply pressure to the bushing in a direction normal to the axis thereof, and other means for simultaneously applying pressure to the flange of the bushing in direction axially thereof.

23. An apparatus for forming compressible bushings to a desired predetermined size having, in combination, an expanding die provided with a recess in which a bushing is adapted to be seated, a mandrel, means for inserting the mandrel in the bushing while the latter is in said recess, and means for contracting the die after the mandrel is inserted in said bushing to compress the bushing to the desired predetermined size.

24. An apparatus for forming flanged compressible bushings to a desired predetermined size having, in combination, an expanding die, a recess within the die provided with a shoulder on which the flange of the bushing is adapted to be seated, a mandrel, means for inserting the mandrel in the bushing while the latter is in said recess, means for contracting the die while the bushing is seated in the recess to apply pressure to the bushing, and means for applying pressure to the flange of the bushing simultaneously with the closing of the die.

25. An apparatus for forming flanged compressible bushings to a desired predetermined size having, in combination, an expanding die, a recess within the die provided with a shoulder on which the flange of the bushing is adapted to be seated, a mandrel, means for inserting the mandrel in the bushing while the latter is in said recess, means for contracting the die while the bushing is seated in the recess to apply pressure to the bushing, and means carried by said mandrel for applying pressure to the flange of the bushing simultaneously with the closing of the die.

In testimony whereof we hereto affix our signatures.

A. H. VALENTINE.
JOHN C. LEMMING.